O. W. HART.
ROLLER BEARING.
APPLICATION FILED FEB. 2, 1918.

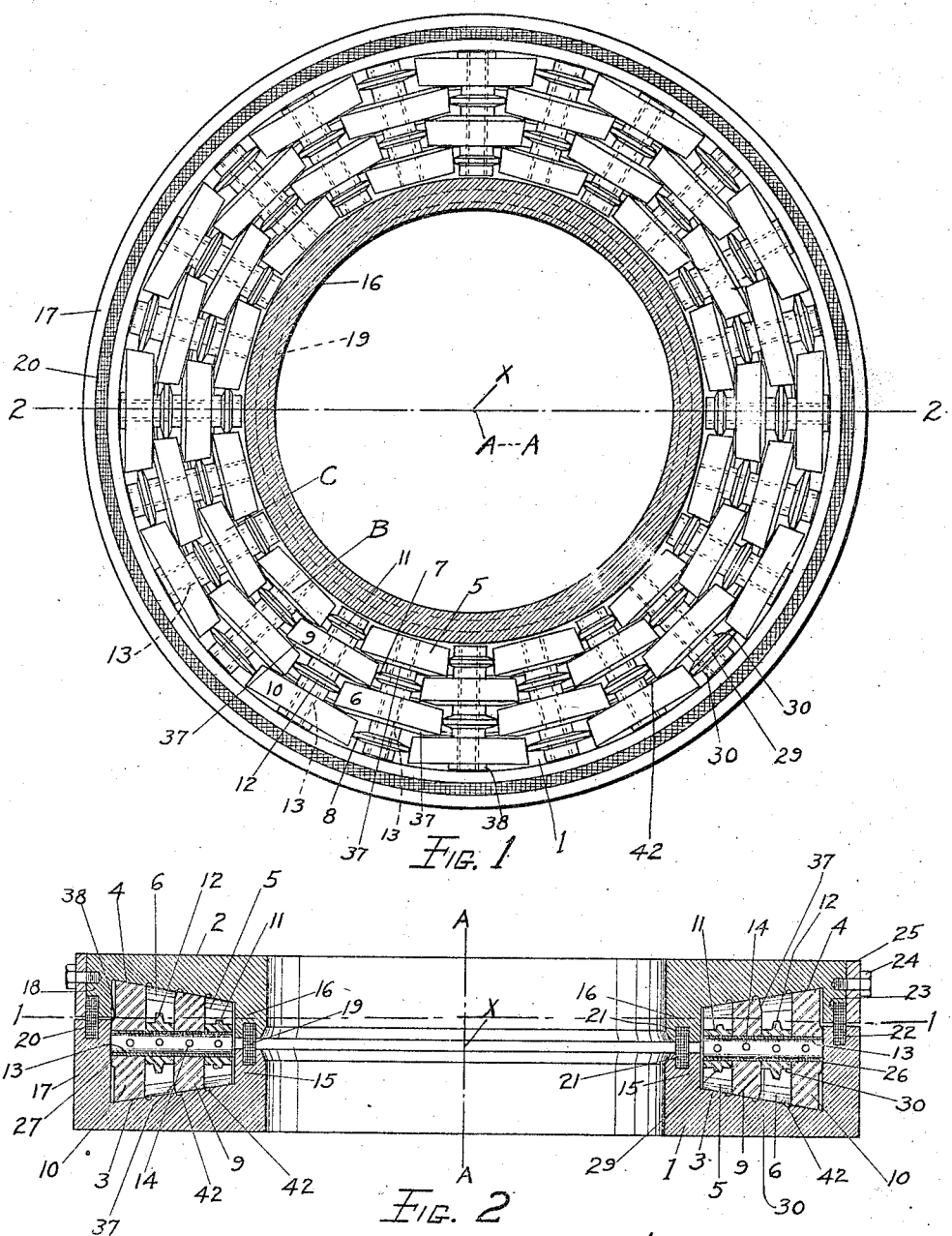

1,300,385.

Patented Apr. 15, 1919.
2 SHEETS—SHEET 2.

INVENTOR
Orlando W. Hart.
by William A. Hardy.
HIS ATTY

UNITED STATES PATENT OFFICE.

ORLANDO W. HART, OF FALL RIVER, MASSACHUSETTS.

ROLLER-BEARING.

1,300,385.  Specification of Letters Patent.  Patented Apr. 15, 1919.

Application filed February 2, 1918. Serial No. 215,068.

*To all whom it may concern:*

Be it known that I, ORLANDO W. HART, a citizen of the United States, and a resident of Fall River, in the county of Bristol and State of Massachusetts, have invented certain new and useful Improvements in Roller-Bearings, of which the following is a description.

My invention relates to roller bearings and more particularly to an improved thrust bearing for taking up end or longitudinal thrusts.

The principal object of my invention is to provide a bearing of this type which will have all the advantages of conical thrust bearings and wherein the objectionable features usually present in such bearings, such as jamming and binding of the rollers and the friction between the parts thereof, will be substantially eliminated or at least greatly reduced.

Other objects of my invention are to provide a thrust bearing wherein the necessity of employing a cage or like spacing means for the rollers is obviated, and wherein a plurality of series of conical rollers is preferably employed, the relative arrangement of the rollers of such series preferably being similar to that shown and described in Patent No. 1,205,449 granted to me on November 21, 1916.

My invention further contemplates a thrust bearing wherein the load will be evenly distributed on the bearing rollers, and of such construction as to insure free and easy travel of the rollers and a continuous and effective lubrication of all parts of the bearing with the use of little lubricant supplied at very infrequent intervals.

A further object of the invention is to provide a bearing of the type described, the parts of which may be easily, quickly and economically manufactured and assembled and wherein any part may be quickly and readily replaced when necessary.

My invention also resides in the construction of parts and combinations of elements hereinafter more fully described and claimed.

In order that my invention may be more clearly understood, attention is directed to the drawings accompanying and forming a part of this specification, and in which:

Figure 1 is a sectional plan view of one form of my improved bearing, taken on line 1—1 of Fig. 2, the rollers being shown in full;

Fig. 2 is a central transverse sectional view taken on line 2—2 of Fig. 1;

Figure 5:
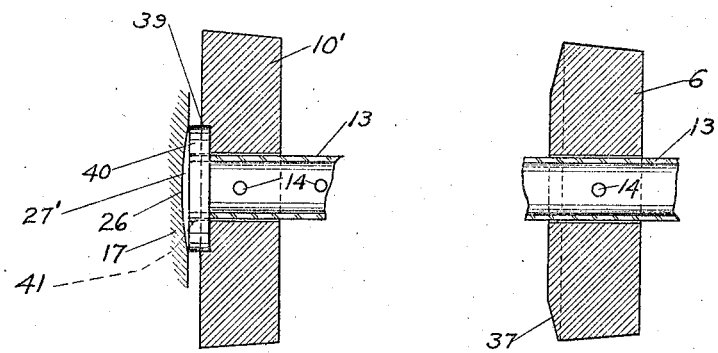
Figure 6:
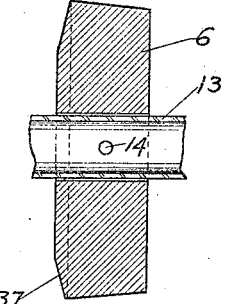

Fig. 5 is an enlarged detailed sectional view of the outer end portion of one of the alining shafts with one of the outermost bearing rollers mounted thereon, and illustrating a slightly modified construction of the means for taking up the outward thrust imposed on the bearing; and Fig. 6 is an enlarged detailed sectional view of a portion of one of the alining shafts and one of the inner bearing rollers mounted thereon.

In all the views of the drawings, corresponding parts are designated by the same reference characters.

Referring to the drawings, and especially to Figs. 1 and 2, reference characters 1 and 2 represent a pair of concentric relatively rotatable members constituting parts of a thrust bearing, these members preferably being annular hardened plates or rings having the same internal diameter. The axis A—A of the plates 1 and 2 constitutes the axis of the bearing. The rings or plates 1 and 2 are respectively provided with opposed annular tracks 3 and 4 for the bearing rollers, these tracks preferably being conical and symmetrical. A plurality of radial series of rollers B and C are disposed between the opposed annular conical tracks 3 and 4, said series of rollers B and C being alternately arranged and extending entirely around said tracks. Each of the radial series of rollers B and C preferably consists of a plurality of alternately arranged conical bearing rollers and conical idler rollers which are preferably staggered with respect to the bearing rollers and idler rollers respectively of each adjacent radial series, whereby each idler roller and bearing roller is in rolling engagement with a bearing roller and idler roller respectively of each of the two adjacent series of rollers. In the bearing shown, each series B comprises two bearing rollers 5 and 6 and two idler rollers 7 and 8, the bearing rollers 5 being the innermost and the idler rollers 8 being the outermost of the rollers of such series with respect to the axis A—A of the bearing; while each series C comprises two bearing rollers 9 and 10 and two idler rollers 11 and 12, the idler roller 11 being the innermost and the bearing roller 10 being the outermost of the rollers of such series with respect to the axis A—A of the bearing. All the rollers of each series B and C are rotatably mounted on a radially disposed small cylindrical alining shaft 13 of uniform diameter which maintains such rollers in proper position. Even though hollow alining shafts 13 are employed, which is preferable in order that the shafts will be adapted to receive lubricant, substantially the entire strength of the bearing rollers is retained, that is, their strength is substantially equal to that of similar solid rollers. This is due to the fact that the shafts 13 are of a uniform diameter which is small as compared with the diameter of the rollers. The alining shafts 13 are also preferably perforated, as at 14, to allow a free and ready distribution of the lubricant with which the bearing is supplied, to the different parts.

The plates 1 and 2 are respectively provided with similar annular inner flanges 15 and 16 which extend toward each other so as to nearly engage, and which provide an inner annular wall for the space between the plates in which the roller assembly is disposed. The plates 1 and 2 are also respectively provided with outer annular flanges 17 and 18 extending toward each other, which provide the outer annular wall for the space in which the roller assembly is disposed. The internal diameters of the flanges 17 and 18 are equal and the distance between the inner and outer walls provided by flanges 15 and 16 and flanges 17 and 18 respectively, is preferably slightly greater in length than the alining shafts 13 and the length of the radial series of rollers B and C.

In order to keep dust and dirt from the roller assembly and to prevent the escape or loss of lubricant, I preferably employ rings 19 and 20 of packing material, such as fiber; the ring 19 extending into annular grooves 21 provided therefor in the opposed ends of the flanges 15 and 16 and tightly sealing the slight space between the latter, and the ring 20 engaging in an annular groove 22 provided therefor in the end of flange 17 and in an annular recess 23 provided in the outer portion of the opposed end of flange 18 and forming a tight seal between said flanges 17 and 18. The flange 18 is thinner than flange 17 and has secured to its outer side, as by bolts 24, a flat annular ring 25 which holds the ring 20 tightly in engagement with the walls of the recess 23. The dimensions of ring 25 are preferably such that its outer surface is flush with the outer surface of flange 17 and its edges are flush with the end surfaces of plate 2 and flange 18 respectively. The provision of recess 23 and the use of ring 25 render it possible to readily and quickly assemble and secure the parts just described in proper position.

The flange 17 is preferably considerably wider than flange 18, extending across and some distance beyond the outer ends of the alining shafts 13, and its inner surface is provided with an annular groove 26 adjacent such ends of shafts 13. The bottom of groove 26 is curved transversely, as shown in Figs. 2 and 5, preferably about the point X, where the axes of shafts 13 intersect the axis A—A of the bearing, as a center. It will be apparent, therefore, that the bottom of groove 26 constitutes a portion of a spherical surface of which the point X is the center. The bearing rollers 5, 6 and 9 and idler rollers 7, 11 and 12 are preferably of the same length, but the outermost bearing and idler rollers 10 and 8 are of slightly greater length because of being provided at their outer ends with extending spherical end portions 27 and 28 respectively. These portions 27 and 28 fit closely in the groove 26, as the surfaces thereof form portions of a sphere having the point X as its center. The wall of said groove 26 accordingly forms an annular track for the portions 27 and 28 and takes up and transmits to the flange 17 and plate or ring 1 all outward thrusts imposed on the roller assembly in the operation of the bearing.

Figure 3:
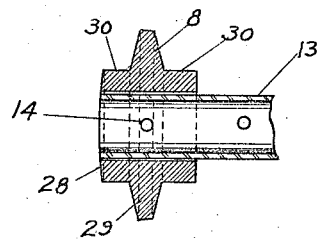
Fig. 3 is an enlarged detailed sectional view showing a portion of one of the alining shafts and one of the idler rollers mounted thereon.
Figure 4:
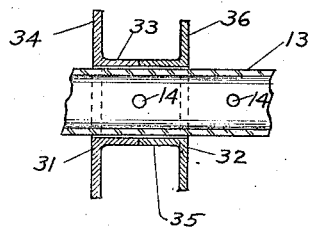
Fig. 4 is a view similar to Fig. 3, showing a modified form of idler roller.

It will be seen that the bearing and idler rollers 5 and 11, 9 and 7, 6 and 12, and 10 and 8 respectively make up four annular series of rollers extending entirely around the tracks 3 and 4, with the bearing and idler rollers of each such series alternately arranged and with the bearing and idler rollers of each such series staggered with respect to the bearing and idler rollers respectively of every adjacent series. The idler rollers do not need to have much strength as they do not carry any of the direct load, serving principally to maintain the bearing rollers of the radial and annular series properly spaced and in proper relative position. Therefore, in order to provide as much free space as possible in advance of each of the bearing rollers or between each pair of adjacent bearing rollers so as to provide a sort of oil well in which lubricant will be maintained in the operation of the bearing, I preferably form each idler roller with a substantially central narrow bearing portion 29 having a conical bearing surface for engagement with the conical bearing surfaces of the two adjacent bearing rollers in the same annular series, and with reduced cylindrical end portions 30, as shown in Figs. 1 to 3. The idler rollers may also be made economically and advantageously in the form shown in Fig. 4, the roller as shown in this figure comprising two sections 31 and 32 preferably stamped or punched from sheet steel, the section 31 comprising a hollow cylindrical sleeve or hub portion 33 adapted to fit loosely on the alining shaft 13 and having an annular flange 34 at one end; and the section 32 comprising a hollow cylindrical sleeve or hub portion 35 similar to the hub portion 33 of section 31 and having an annular flange 36 at one end. The sections 31 and 32 may be placed on the alining shafts so that either the free ends of the sleeve or hub portions 33 and 35 or the flanges 34 and 36 thereof will abut against each other. In either case the flanges 34 and 36 are formed so that the peripheral bearing surfaces thereof comprise portions of a common conical surface whereby they will have proper rolling engagement with the conical bearing surfaces of the adjacent bearing rollers in the same annular series.

The idler rollers at their bearing portions are preferably of a diameter substantially one-half that of the bearing rollers in the respective annular series, whereby only the outer portions of the bearing rollers of adjacent series, of a width equal to substantially one-fourth the diameter thereof, will overlap each other. Consequently, the end surfaces of the bearing rollers are in engagement only at their outer portions with a consequent reduction in friction when the bearing is in operation. In order to still further reduce the friction and wear of the bearing rollers of adjacent series due to this engagement, and in order that the bearing rollers of the adjacent series will properly and closely intermesh, as shown in Fig. 1, the outer portions of the outer ends of all the rollers 5, 9 and 6 are beveled as shown at 37, so that the surfaces of the bevels will be respectively parallel to the inner end surfaces of the rollers 9, 6 and 10 with which they engage. The provision of the bevels 37, of course, reduces the width of the peripheral bearing surfaces of the rollers; the amount of bevel preferably being such that the bearing surfaces of the rollers 5, 9 and 6 will be of equal width and there will be no axial separation of the bearing and idler rollers of the series B and C when the said bevels are closely adjacent the respective inner end surfaces of the adjacent bearing rollers. The rollers 10 are provided with bearing surfaces of the same width as the bearing surfaces of rollers 5, 9 and 6, and, in the construction shown in Figs. 1 and 2, with reduced outer end portions 38 having the extending spherical portions 27 which fit and run in the annular groove 26. The length of rollers 10, exclusive of the extending end portions 27, is the same as that of the rollers 5, 6 and 9. A slight clearance is preferably provided between the annular inner wall of the space in which the roller assembly is disposed, and the inner ends of rollers 5 and 11, and between the annular outer wall of said space and the outer portions of the outer ends of rollers 10.

Instead of forming the rollers 10 as shown in Figs. 1 and 2, it is advantageous under some circumstances to employ the construction shown in Fig. 5. In this figure, 10' represents one of the outermost bearing rollers. The bearing surface of this roller is of the same width as the bearing surfaces of the rollers 10 in Figs. 1 and 2, but instead of being formed with the reduced end portion 38, it is provided in its outer end surface with a central cylindrical recess 39 in which is rotatably mounted a hardened cylindrical button 40. The button 40 has an outer spherical end 27', similar to the outer spherical ends 27 on the reduced end portions 38 of the rollers 10 shown in Figs. 1 and 2, which closely fits the annular groove or track 26 in flange 17. The button 40 is provided with a cylindrical recess 41 in which the outer end portion of the respective shaft 13 loosely fits. The construction just described results in a still further reduction in friction, especially in bearings designed for extremely heavy loads, and is also easier to manufacture when the parts are of large size.

In order to prevent the formation of ridges on the annular wearing tracks 3 and 4, I preferably provide these tracks with small annular grooves 42 respectively located on the paths of travel of adjacent edges of the bearing surfaces of rollers 5, 9, 6 and 10.

The bearing surface of each of the bearing and idler rollers forms a portion of a conical surface, which, when the bearing is assembled, has the point X in the axis A—A of the bearing as an apex. Furthermore, the bearing surfaces of the bearing rollers in any two adjacent series B and C form portions of a common conical surface. This is also true of the bearing surfaces of the idler rollers in such series. It will therefore be apparent that my improved bearing has decided advantages from a manufacturing standpoint, as practically all parts and surfaces thereof when the bearing is assembled, have a common working center, viz. the point X. Because of this, numerous settings of tools, such as grinders, etc., in making the bearing are obviated. Moreover, the conical bearing surfaces of the rollers 5, 9, 6 and 10 of any two adjacent series B and C may be simultaneously ground, this also being true of the bearing surfaces of the idler rollers of such series. The parts of my bearing can be easily and quickly assembled, and any part may be readily replaced. Furthermore, all the shafts 13 are interchangeable, as are also the idler rollers and bearing rollers of each annular series of rollers.

While my invention relates particularly to conical thrust bearings, it is not limited thereto, as many of the features thereof are applicable to other types of bearings. It is also to be understood that the specific constructions illustrated and described herein are subject to various changes and modifications without any departure from the spirit of the invention and the scope of the appended claims. For example, it is obvious that the number of series of rollers employed or the number of rollers in any series may be varied as desired.

Having now described my invention, what I claim as new and desire to protect by Letters Patent is as follows:—

1. In a thrust bearing, a plurality of radially arranged series of bearing and idler rollers, the bearing rollers of adjacent series being in staggered relation.

2. In a thrust bearing, a plurality of radially arranged series of rollers, each series comprising bearing and idler rollers alternately arranged, the bearing rollers of adjacent series being in staggered relation.

3. In a thrust bearing, a plurality of radially arranged series of rollers, each series comprising bearing and idler rollers alternately arranged, the bearing rollers of adjacent series being in staggered relation and the correspondingly located rollers of adjacent series being in rolling engagement.

4. In a thrust bearing, a plurality of radially arranged series of rollers, each series comprising bearing and idler rollers alternately arranged, the idler rollers of adjacent series being in staggered relation.

5. In a thrust bearing, a plurality of radially arranged series of rollers, each series comprising conical bearing and idler rollers alternately arranged, the bearing rollers of adjacent series being in staggered relation.

6. A thrust bearing comprising a plurality of bearing rollers each having its axis disposed radially with respect to the axis of the bearing, and a plurality of alining shafts, each of the bearing rollers of the bearing being loosely mounted on an alining shaft, and each of the alining shafts coacting with other rollers of the bearing to maintain the roller or rollers mounted thereon in proper position.

7. In a thrust bearing, a plurality of radially arranged series of rollers, and a shaft on which the rollers of each series are loosely mounted, the rollers of adjacent series being in staggered relation.

8. In a thrust bearing, a plurality of radially disposed series of rollers, each series comprising conical bearing and idler rollers alternately arranged, each of the idler rollers having rolling engagement with a bearing roller of each of the two adjacent series of rollers.

9. A thrust bearing comprising a plurality of conical bearing rollers each having its axis disposed radially with respect to the axis of the bearing, and a plurality of cylindrical alining shafts, each of the bearing rollers of the bearing being loosely mounted on an alining shaft, and each of the alining shafts coacting with other rollers of the bearing to maintain the roller or rollers mounted thereon in proper position.

10. In a thrust bearing, a plurality of radially arranged series of rollers, each series comprising conical bearing and idler rollers alternately arranged, and a shaft on which the bearing and idler rollers of each series are loosely mounted.

11. In a thrust bearing, a plurality of radially disposed series of rollers, each series comprising conical idler and bearing rollers alternately arranged, each of the idler rollers having rolling engagement with a bearing roller of each of the two adjacent series of rollers, the bearing surfaces of the idler rollers of each pair of adjacent series forming portions of a common conical surface.

12. In a thrust bearing, a plurality of radially disposed series of bearing rollers, the bearing rollers of adjacent series being in staggered relation, and idler rollers respectively disposed between adjacent bearing rollers of each series.

13. In a thrust bearing, a plurality of radial series of rollers, each series comprising alternately arranged conical bearing and idler rollers, the bearing surfaces of all the rollers forming portions of conical surfaces having a common apex, and the bearing rollers of adjacent series being in staggered relation.

14. In a thrust bearing, a plurality of radial series of rollers, each series comprising alternately arranged conical bearing and idler rollers, the rollers of each series being loosely mounted on a shaft, the axes of all said shafts intersecting the axis of the bearing at a single point, said point being the common apex of a plurality of conical surfaces of which the bearing surfaces of said rollers respectively comprise a part.

15. An idler roller for roller bearings comprising an enlarged portion having a conical bearing surface and a reduced hub portion.

16. A sheet metal idler roller for roller bearings comprising a sleeve or hub provided with a flange having a conical bearing surface.

17. A sheet metal idler roller for roller bearings, consisting of a pair of separable sections, each section comprising a sleeve or hub and a flange having a conical bearing surface.

18. In a thrust bearing, a plurality of series of bearing rollers, the rollers of adjacent series being staggered, and the outer portions of the outer end surfaces of some of the bearing rollers being beveled.

19. In a thrust bearing, a plurality of annular series of bearing rollers, the rollers of adjacent series being staggered, and the outer portions of the outer end surfaces of each of the bearing rollers except those of the outermost series being beveled.

20. In a thrust bearing, a plurality of series of bearing rollers, the rollers of adjacent series being staggered, and the outer portions of the outer end surfaces of some of the bearing rollers being beveled so that the beveled portions are respectively substantially parallel to the inner faces of the rollers which they respectively overlap.

21. In a roller bearing, an annular roller assembly, an annular wall embracing said roller assembly, said wall having an annular groove, the bottom of which forms a portion of a spherical surface, the roller assembly being provided with parts adapted to transmit outward thrusts imposed on the bearing to said wall, said parts having spherical surfaces fitting said groove.

22. In a thrust bearing, a plurality of radial series of rollers, an annular wall embracing said series of rollers and provided with an annular groove, the bottom of which forms a portion of a spherical surface having a point in the axis of the bearing as its center, each series of rollers having at its outer end a part formed with a spherical surface closely fitting said groove.

23. In a thrust bearing, a plurality of annular series of bearing rollers, an annular wall embracing said series of rollers and provided with an annular groove, the bottom of which forms a portion of a spherical surface, and a plurality of members respectively loosely engaging in recesses provided therefor in the outer ends of the bearing rollers of the outermost series and having spherical outer ends closely fitting said groove.

24. In a thrust bearing, a roller assembly, a wall embracing the roller assembly and provided with an annular groove, the bottom of which forms a portion of a spherical surface, and which is arranged to take up outward thrusts imposed on the bearing.

This specification signed and witnessed this 25th day of January, 1918.

ORLANDO W. HART.

Witnesses:
JESSIE E. STALKER,
JACOB UNGER.

Copies of this patent may be obtained for five cents each, by addressing the "Commissioner of Patents, Washington, D. C."